US008687936B2

United States Patent
Nakanishi et al.

(10) Patent No.: US 8,687,936 B2
(45) Date of Patent: Apr. 1, 2014

(54) OPTICAL FIBER, OPTICAL TRANSMISSION SYSTEM, AND METHOD OF MAKING OPTICAL FIBER

(71) Applicant: Sumitomo Electric Industries, Ltd., Osaka (JP)

(72) Inventors: Tetsuya Nakanishi, Yokohama (JP); Tatsuya Konishi, Yokohama (JP); Kazuya Kuwahara, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/706,458

(22) Filed: Dec. 6, 2012

(65) Prior Publication Data

US 2013/0148934 A1 Jun. 13, 2013

(30) Foreign Application Priority Data

Dec. 9, 2011 (JP) ................................ 2011-270269

(51) Int. Cl.
*G02B 6/00* (2006.01)

(52) U.S. Cl.
USPC ........... 385/141; 385/122; 385/123; 385/124; 385/142

(58) Field of Classification Search
USPC .................................. 385/122–124, 141–142
See application file for complete search history.

(56) References Cited

U.S. PATENT DOCUMENTS

| | | | |
|---|---|---|---|
| 2008/0285927 A1* | 11/2008 | Khan et al. | 385/123 |
| 2010/0272406 A1* | 10/2010 | Bookbinder et al. | 385/124 |
| 2011/0064368 A1* | 3/2011 | Bookbinder et al. | 385/123 |
| 2011/0103758 A1* | 5/2011 | Ohsono et al. | 385/124 |

FOREIGN PATENT DOCUMENTS

| | | |
|---|---|---|
| JP | 2002-267868 A | 9/2002 |
| JP | 2006-058494 A | 3/2006 |
| JP | 2007-052458 A | 3/2007 |
| JP | 2008-094633 A | 4/2008 |
| JP | 2009-168813 A | 7/2009 |
| WO | WO 2009-066429 A1 | 5/2009 |
| WO | WO 2009-096557 A1 | 8/2009 |

OTHER PUBLICATIONS

Shigeki Sakaguchi et al. "Rayleigh scattering of silica core optical fiber after heat treatment," Applied Optics, Nov. 20, 1998, pp. 7708-7711, vol. 37, No. 33.

(Continued)

*Primary Examiner* — Ryan Lepisto
*Assistant Examiner* — Guy Anderson
(74) *Attorney, Agent, or Firm* — Drinker Biddle & Reath LLP

(57) ABSTRACT

Provided is an inexpensive low-loss optical fiber suitably used in an optical transmission network. An optical fiber includes a core, an optical cladding, and a jacket. The core has a relative refractive index difference between 0.2% and 0.32% and has a refractive index volume between 9%·$\mu m^2$ and 18%·$\mu m^2$. The jacket has a relative refractive index difference between 0.03% and 0.20%. Glass constituting the core has a fictive temperature between 1400° C. and 1560° C. Stress remaining in the core is compressive stress. A cutoff wavelength measured on a fiber having a length of 2 m is 1300 nm or more and a cutoff wavelength measured on a fiber having a length of 100 m is 1500 nm or less. An effective area at a wavelength of 1550 nm is 110 $\mu m^2$ or more. A attenuation at a wavelength of 1550 nm is 0.19 dB/km or less.

15 Claims, 8 Drawing Sheets

(56) References Cited

OTHER PUBLICATIONS

Masaharu Ohashi et al., "Imperfection Loss Reduction in Viscosity-Matched Optical Fibers," IEEE Photonics Technology Letters, Jul. 1993, pp. 812-814, vol. 5, No. 7.

K. Saito et al, "Control of Glass-Forming Process During Fiber-Drawing to Reduce the Rayleigh Scattering Loss," Journal of the American Ceramic Society, Jan. 2006, pp. 65-69, vol. 89, No. 1.

D.-L. Kim et al., "Fictive temperature of silica glass optical fibers—re-examination," Journal of Non-Crystalline Solids, 2001, pp. 132-138, vol. 286.

* cited by examiner

OPTICAL FIBER, OPTICAL TRANSMISSION SYSTEM, AND METHOD OF MAKING OPTICAL FIBER

BACKGROUND OF THE INVENTION

1. Field of the Invention

The present invention relates to an optical fiber, an optical transmission system, and a method of making the optical fiber.

2. Description of the Related Art

Optical fibers, used as an optical transmission line in optical transmission networks with a transmission rate of 100 Gbit/s or higher, preferably have low attenuation and low nonlinearity. When $n_2$ denotes the nonlinear refractive index of an optical fiber and Aeff denotes the effective area thereof, the nonlinearity of the optical fiber is defined by $n_2$/Aeff. As the effective area Aeff is larger, the nonlinearity is lower, because concentration of optical power density on the core is prevented. A general-purpose single-mode optical fiber (SMF) compliant with the ITU-T G. 652 standard has an effective area Aeff of approximately 80 µm² at a wavelength of 1550 nm. It is however preferable that the effective area Aeff of an optical fiber with low nonlinearity be greater than or equal to 110 µm² and less than or equal to 180 µm².

Unfortunately, as the effective area Aeff increases, microbending loss increases, thus leading to increased loss upon cable formation. Additionally, as the effective area Aeff increases, loss in connection with a general-purpose single-mode optical fiber increases. Considering the effect of the effective area Aeff on microbending loss and connection loss, the effective area Aeff is preferably less than or equal to 150 µm², though this value varies depending on the refractive index profile of an optical fiber and the Young's modulus and thickness of resin coating.

A pure-silica-core optical fiber (PSCF) is known as a low-loss optical fiber. A $GeO_2$-doped core optical fiber (GCF) has been considered as being inferior to the PSCF with respect to the above-described large capacity communication, since the GCF has higher Rayleigh scattering loss than the PSCF due to concentration fluctuations of $GeO_2$. A typical PSCF is expensive. Accordingly, an inexpensive optical fiber with achieved low loss and low nonlinearity is demanded.

S. Sakaguchi et al., Applied Optics, Vol. 37, No. 33, pp. 7708-7711 (1998) and JP2006-58494A disclose technology for reducing loss in the GCF. According to this technology, when an optical fiber preform is drawn to form an optical fiber, the optical fiber is slowly cooled to reduce the fictive temperature of glass constituting the fiber in order to reduce Rayleigh scattering in the optical fiber, thus achieving low loss.

SUMMARY OF THE INVENTION

Accordingly, the object of the present invention is to provide an inexpensive low-loss optical fiber suitably used as an optical transmission line in an optical transmission system, an optical transmission system including the optical fiber as a transmission line, and a method capable of making the optical fiber.

The present invention provides a silica glass optical fiber including a core including the center axis, an optical cladding surrounding the core, and a jacket surrounding the optical cladding. The core contains $GeO_2$ and has a relative refractive index difference Δcore greater than or equal to 0.2% and less than or equal to 0.32% and has a refractive index volume v greater than or equal to 9%·µm² and less than or equal to 18%·µm², the refractive index volume v being expressed by Eq. (1):

$$v = 2\int_0^a \Delta(r) \cdot r \, dr \quad (1)$$

where Δ(r) denotes the relative refractive index difference at a radial coordinate r and a denotes the diameter of the core. The jacket has a relative refractive index difference ΔJ greater than or equal to 0.03% and less than or equal to 0.20%. Glass constituting the core has a fictive temperature greater than or equal to 1400° C. and less than or equal to 1560° C. Stress remaining in the core is compressive stress. A cutoff wavelength measured on a fiber having a length of 2 m is greater than or equal to 1300 nm. A cutoff wavelength measures on a fiber having a length of 100 m is less than or equal to 1500 nm. An effective area at a wavelength of 1550 nm is greater than or equal to 110 µm². An attenuation at a wavelength of 1550 nm is less than or equal to 0.19 dB/km. The fictive temperature may be less than or equal to 1530° C.

In this specification, the "relative refractive index difference" is defined as a refractive index difference of each object based on the refractive index $n_{optical\ cladding}$ of the optical cladding: $\Delta object = (n_{object} - n_{optical\ cladding})/n_{optical\ cladding}$. As regards the refractive index of the core, an equivalent step index (ESI) is used. A diameter at which a derivative of refractive index with respect to the radial coordinate at the interface between the optical cladding and the jacket reaches its maximum is defined as an outside diameter of the optical cladding. The refractive index of the jacket is the mean value of refractive indices of the optical cladding from part having the outside diameter of the optical cladding to outermost part of the glass.

In the optical fiber according to the present invention, an attenuation at a wavelength of 1550 nm may be less than or equal to 0.178 dB/km and an attenuation at a wavelength of 1310 nm may be less than or equal to 0.315 dB/km. Stress in part of 50% or more of the cross-sectional area of the jacket in a cross section perpendicular to the axis of the fiber may be tensile stress. The absolute value of stress remaining in the core may be less than or equal to 30 MPa. An increment in attenuation due to OH groups at a wavelength of 1383 nm may be less than or equal to 0.02 dB/km. The core may contain fluorine. The jacket may have a higher viscosity than the core by 0.3 poise or more at a temperature of 1300° C. A change in relative refractive index difference of the core during annealing for one minute or more at a temperature of 1300° C. after drawing may be greater than or equal to 0.002% and less than or equal to 0.02%.

In the optical fiber according to the present invention, the difference in stress between the core and the optical cladding may be less than or equal to 20 MPa. The optical fiber has an attenuation α and the attenuation α may be approximated by the equation $\alpha = A \cdot \exp(B/\lambda)$ in a range of wavelengths greater than or equal to 1600 nm by using least squares, where λ denotes a wavelength and A is less than or equal to $6.5 \times 10^{11}$ and B is greater than or equal to 48.5. The optical fiber may further include a primary coating and a secondary coating which surround the jacket. The secondary coating may have a Young's modulus greater than or equal to 800 MPa. The primary coating may have a Young's modulus greater than or equal to 0.2 MPa and less than or equal to 1 MPa. The optical fiber with coating may have an outside diameter greater than or equal to 240 µm and the secondary coating may have a thickness greater than or equal to 10 µm.

The present invention provides an optical transmission system including two repeaters and an optical transmission line connecting the two repeaters, wherein the optical transmission line has a length greater than or equal to 70 km and a section of 90% or more of the optical transmission line includes the optical fiber according to the present invention. The present invention further provides an optical transmission system including an optical transmission line that includes the optical fiber according to the present invention, wherein signal light is distributed-Raman-amplified in the optical fiber.

The present invention provides a method of making an optical fiber, the method including melting and drawing an optical fiber preform in a drawing furnace, wherein the mean temperature in cross-section of the optical fiber at the time when the drawn optical fiber emerges from the drawing furnace is greater than or equal to 1200° C. and less than or equal to 1550° C. The drawn optical fiber may be allowed to, while being at a temperature at or above 1000° C., enter a heating furnace disposed downstream from the drawing furnace. In the optical fiber making method according to the present invention, the optical fiber preform may include a core including the center axis, an optical cladding surrounding the core, and a jacket surrounding the optical cladding. The concentration of OH at the interface between the optical cladding and the jacket may be less than or equal to 1000 wtppm.

The present invention provides an inexpensive low-loss optical fiber suitably used as an optical transmission line in an optical transmission network.

DESCRIPTION OF THE PREFERRED EMBODIMENTS

Figure 1:
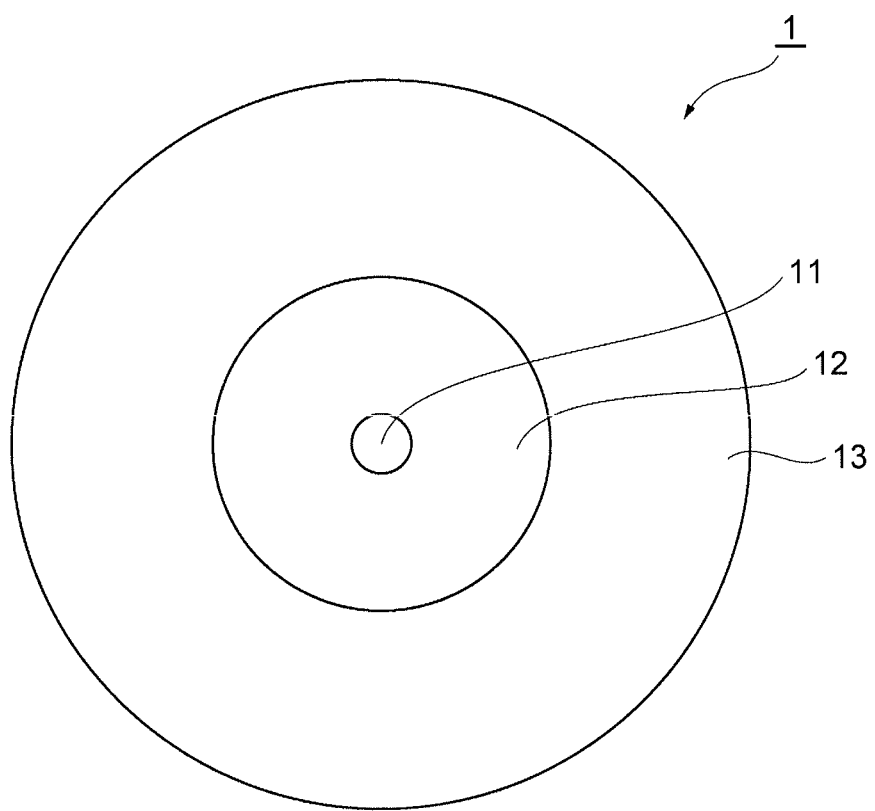
FIG. 1 is a cross-sectional view of an optical fiber according to an embodiment of the present invention.

Embodiments of the present invention will be described in detail below with reference to the accompanying drawings. In the figures, the same components are designated by the identical reference numerals and redundant description is avoided.

The inventors have found that in the race where the core contains $GeO_2$, if the fictive temperature of glass is reduced by slow cooling to reduce Rayleigh scattering, loss components (hereinafter, referred to as "excess loss") caused by factors other than Rayleigh scattering may increase and a low-loss optical fiber may not always be achieved. As far as the inventors know, the relationship between excess loss in an optical fiber including a $GeO_2$-containing core and the absolute value of residual stress in the core is not mentioned in S. Sakaguchi et al. and JP2006-58494A, which disclose reduction of attenuation in an optical fiber by slow cooling of glass, and M. Ohashi et al., IEEE Photonics Technology Letters, Vol. 5, No. 7, pp. 812-814 (1993) which discloses reduction of attenuation in an optical fiber by core-cladding viscosity matching.

FIG. 1 is a cross-sectional view of an optical fiber 1 according to an embodiment of the present invention. The optical fiber 1 is an optical fiber that is composed of $SiO_2$ glass and includes a core 11 including the center axis, an optical cladding 12 surrounding the core 11, and a jacket 13 surrounding the optical cladding 12. The core 11 contains $GeO_2$ and may further contain fluorine. The optical cladding 12 has a lower refractive index than the core 11. The optical cladding 12 may be composed of pure $SiO_2$ glass or $SiO_2$ glass containing fluorine. The jacket 13 is composed of pure $SiO_2$ glass and may contain chlorine.

Reducing Rayleigh scattering in the optical fiber 1 can reduce loss in the optical fiber 1. Reducing the fictive temperature of glass constituting the optical fiber 1 is effective in reducing Rayleigh scattering. Methods of reducing the fictive temperature of glass include a first method and a second method as follows.

The first method is a method (slow cooling method) of, during drawing of an optical fiber preform to form the optical fiber 1, slowing the rate of cooling of the formed optical fiber to accelerate the network structural relaxation of glass, thus reducing the fictive temperature of glass. The second method is a method of adding a very small amount of additive, which does not add attenuation caused by light absorption while accelerating the structural relaxation of the core 11, to the core 11, thus reducing the fictive temperature of glass.

The optical fiber 1 may be subjected to reduction of Rayleigh scattering by either of the first and second methods or may be subjected to reduction of Rayleigh scattering by appropriate combination of the methods. In the following description, it is assumed that the slow cooling method is used.

A method of making the optical fiber 1 is as follows. First, a core through which light travels is formed by vapor-phase synthesis, such as VAD, OVD, MCVD, or PCVD, and the core is surrounded with a jacket layer formed by VAD, OVD, APVD, a rod-in-collapse method, or a method similar to the method, thus forming an optical fiber preform. An intermediate optical cladding layer may be formed by VAD, OVD, MCVD, the rod-in-collapse method, or a method similar thereto such that the formed layer is interposed between the core and the jacket. The optical fiber preform formed in this manner is grasped by a drawing tower, a lower end of the preform is heated at or above a working temperature, and a drop-shaped tip of melted glass is appropriately drawn to form a fiber, thus making a glass fiber. While the rate of drawing is being controlled such that the glass fiber has a predetermined outside diameter, the glass fiber is allowed to pass through, for example, a die for depositing resin on the glass fiber and a UV furnace for curing the resin, thus forming a coated optical fiber with a resin coating layer. The coated optical fiber is wound on a take-up bobbin.

The resin coating layer has a double-layer structure and includes a primary coating that protects the glass fiber against direct application of external force and a secondary coating that protects the glass fiber against external damage. Dies for applying the resin coatings may be arranged in series at a stage of fiber formation. Alternatively, the resin coatings may be applied by a die for simultaneously ejecting two coatings. In this case, the drawing tower can be reduced in height. Accordingly, the cost of constructing a structure for housing the drawing tower can be reduced.

Furthermore, a device for controlling the rate of cooling the formed glass fiber may be placed between a drawing furnace and the die, so that a surface temperature of the glass fiber entering the die can be controlled at a proper temperature. Preferably, a gas flowing through the device for controlling the cooling rate has a lower Reynolds number because vibrations due to the occurrence of turbulence on the formed fiber are reduced. Furthermore, controlling the cooling rate of the glass fiber can reduce Rayleigh scattering, thus achieving an optical fiber with low attenuation.

In the UV furnace for curing the resin, the rate of curing of the resin can be appropriately controlled by feedback-controlling the intensity of UV light and a temperature in the furnace. A magnetron or an ultraviolet LED is suitably used in the UV furnace. In the use of the ultraviolet LED, since such a light source does not generate heat, a mechanism for supplying hot air is additionally disposed so that the furnace is controlled to a proper temperature. A component leaving from the resin may adhere to an inner surface of a furnace tube of the UV furnace, leading to a change in power of UV light that reaches the coating layer during drawing. Accordingly, the degree of reduction in UV light power during drawing may be previously monitored and the power of UV light may be controlled on the basis of drawing time such that UV light applied to the coating layer is controlled at constant power. On the other hand, the UV light leaked from the furnace tube may be monitored and the power of UV light may be controlled such that UV light applied to the coating layer is controlled at constant power. This enables the optical fiber to have a uniform tensile strength throughout the entire length thereof.

The thickness of the secondary coating of the two coatings is appropriately set so as to keep the resistance to external damage. Typically, the thickness of the secondary coating is preferably greater than or equal to 10 µm, more preferably greater than or equal to 20 µm. The optical fiber 1 made in this manner and wound on the take-up bobbin is colored as necessary and is used as an end product, such as an optical cable or an optical cord.

Figure 2:
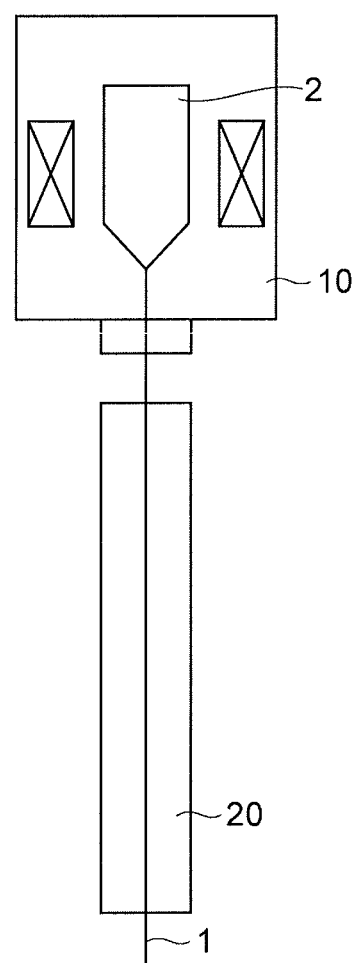
FIG. 2 is a schematic diagram of an optical fiber making apparatus used in a method of making the optical fiber according to the embodiment of the present invention.

According to the embodiment of the present invention, the optical fiber formed in the drawing furnace passes through a quenching portion, serving as the lower end of the drawing furnace, and a heating furnace and then enters the die. The quenching portion cools a region from tapered part, whose diameter ranges from 90% to 5% of the diameter of the preform, in the lower end of the melted optical fiber preform to part, in which the formed optical fiber is at a temperature of 1400° C., at a cooling rate greater than or equal to 1000° C./s and less than or equal to 20000° C./s in a continuous manner. The heating furnace is disposed below a plane (outlet of the drawing furnace) from which the formed optical fiber substantially emerges from the drawing furnace. The distance between the outlet of the drawing furnace and an inlet of the heating furnace is 1 m or less. FIG. 2 is a schematic diagram of an optical fiber making apparatus used in an embodiment of a method of making the optical fiber according to the present invention. A portion between an outlet of a drawing furnace 10 for drawing an optical fiber preform 2 and an inlet of a heating furnace 20 may have a thermal insulating structure for preventing a decrease in temperature of the formed optical fiber 1. When entering the heating furnace 20, the optical fiber is preferably at a temperature greater than or equal to 1000° C., more preferably greater than or equal to 1400° C.

This enables a reduction in length of the heating furnace in which the optical fiber is reheated to a temperature (typically, a temperature at or above the glass transition point) which substantially allows structural relaxation. Thus, the time required for structural relaxation can be increased. When V denotes the drawing rate, the length, L, of the heating furnace is set such that L/V is greater than or equal to 0.05 s. Preferably, the heating furnace includes a plurality of furnaces. Thus, the cooling rate of the optical fiber can be controlled more accurately. Preferably, the cooling rate is greater than or equal to 5000° C./s until the optical fiber in the heating furnace is cooled at or below 1100° C. The use of the above-described heating furnace for optical fiber production can achieve an optical fiber with reduced Rayleigh scattering.

Figure 3:
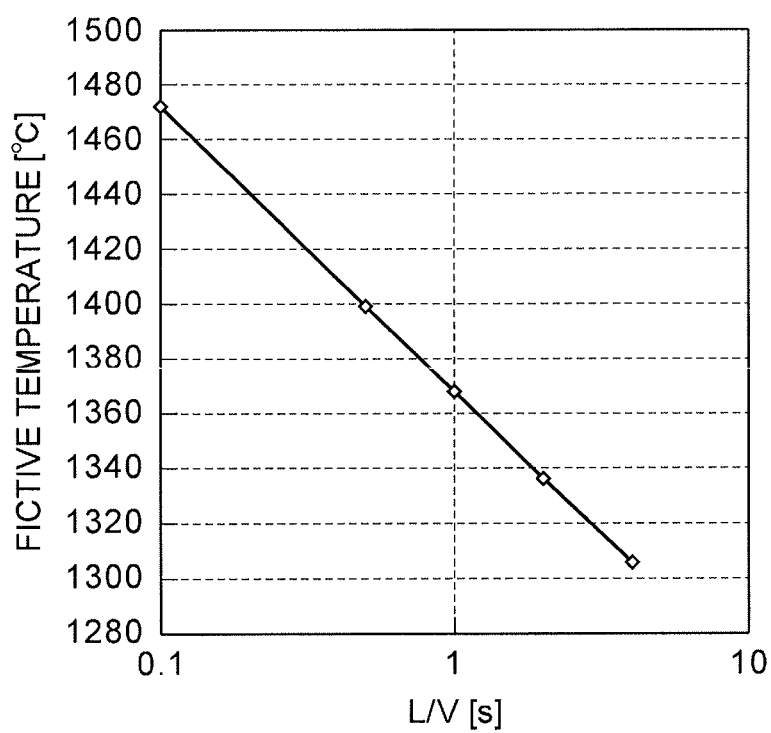
FIG. 3 is a graph illustrating the relationship between L/V regarding an optical fiber including a $GeO_2$-containing core and the reachable fictive temperature.

Increasing L/V can reduce the fictive temperature of glass. Considering economics, the drawing rate V is preferably greater than or equal to 20 m/s. For example, to achieve L/V=0.2 s, the length L of the heating furnace has to be 4 m. As described above, the compatibility between the reduction of the construction cost for the production equipment and the reduction of the manufacturing cost attained by increase of the drawing rate has a certain limit. FIG. 3 is a graph illustrating the relationship between L/V and the reachable fictive temperature in the optical fiber including the $GeO_2$-containing core, the graph being based on data of Table 1 of K. Saito et al., J. Am. Ceram. Soc., Vol. 89 [1], pp. 65-69 (2006). In the case where L/V<0.5 s is permitted in consideration of economic requirements, the reachable fictive temperature is 1400° C.

Figure 4:
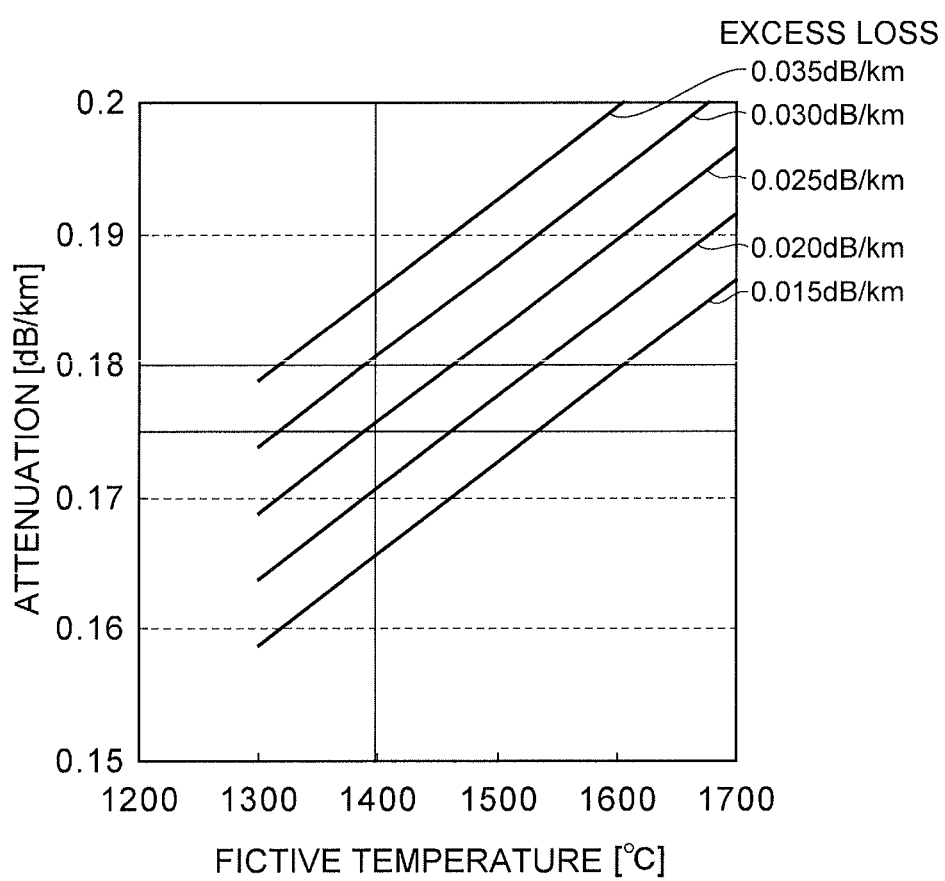
FIG. 4 is a graph illustrating the relationship between the fictive temperature and attenuation in the optical fiber.
Figure 5:
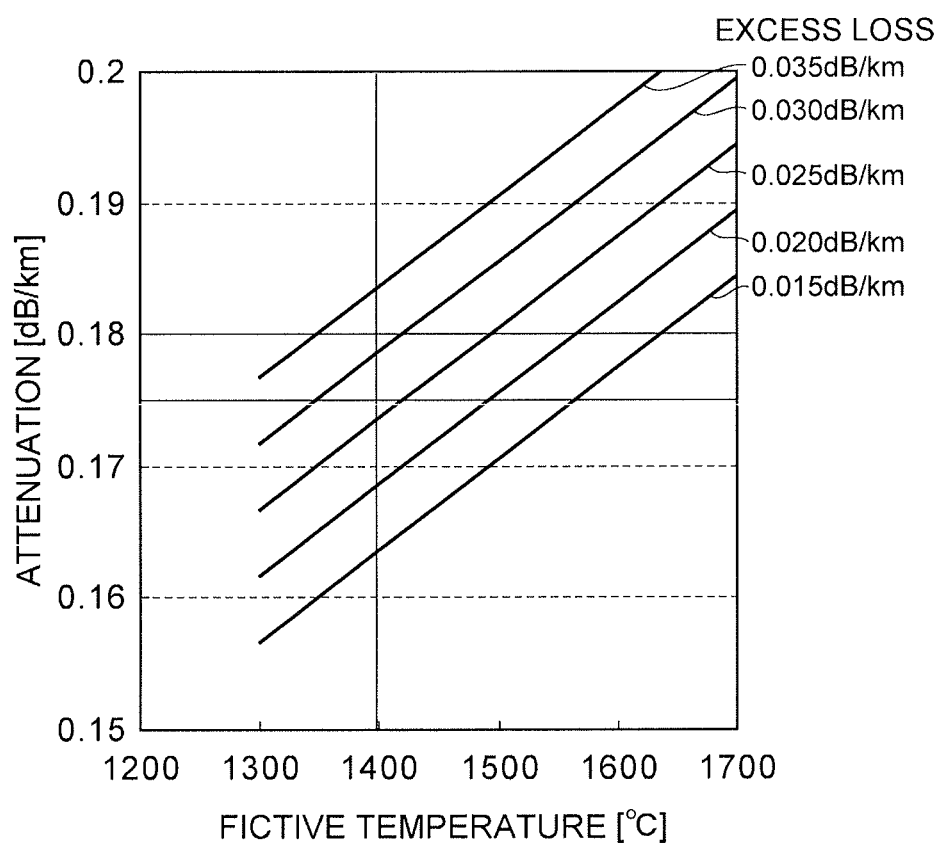
FIG. 5 is a graph illustrating the relationship between the fictive temperature and attenuation in the optical fiber.

FIGS. 4 and 5 are graphs formed on the basis of Eq. (2) of K. Saito et al., each graph illustrating the relationship between the fictive temperature and attenuation in an optical fiber. FIG. 4 depicts a case where the core has a relative refractive index difference of 0.32%. FIG. 5 depicts a case where the core has a relative refractive index difference of 0.2%. In this specification, the term "excess loss" means attenuation (including macrobending loss and microbending loss) other than loss caused by Rayleigh scattering, Brillouin scattering, and Raman scattering. The graphs demonstrate that, when the excess loss is greater than or equal to 0.03 dB/km, it is difficult to achieve an attenuation of 0.18 dB/km at a wavelength of 1550 nm on condition that the fictive temperature is 1400° C.

Figure 6:
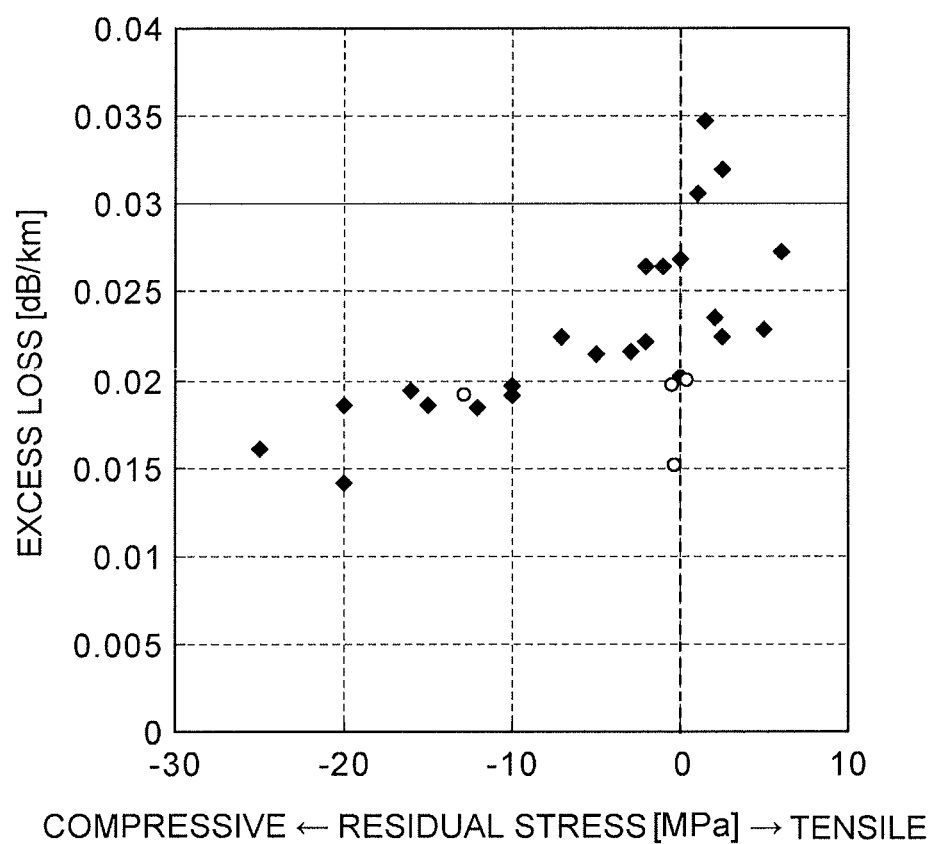
FIG. 6 is a graph illustrating the relationship between stress remaining in the core and excess loss.

As described above, in the case where the fictive temperature of glass is reduced by slow cooling such that Rayleigh scattering is reduced but the excess loss caused by factors other than a Rayleigh scattering component increases, it is difficult to allow attenuation at a wavelength of 1550 nm to be stable less than or equal to 0.18 dB/km. The inventors have determined factors causing the increase of excess loss and thus found good correlation between excess loss and residual stress in the core. FIG. 6 is a graph illustrating the relationship between stress remaining in the core and excess loss. The graph demonstrates that when residual stress in the core is compressive stress, excess loss can be less than or equal to 0.03 dB/km. Furthermore, when residual stress is compressive stress having an absolute value at or above 5 MPa, excess loss can be less than or equal to 0.025 dB/km.

Comparison between FIGS. 4 and 5 demonstrates that a reduction in relative refractive index difference of the core leads to reduction of Rayleigh scattering caused by concentration fluctuation components, such that an optical fiber with lower loss can be achieved. As regards other requirements, it is preferable that the difference in stress between the core and the optical cladding be less than or equal to 20 MPa, because an excess loss of 0.03 dB/km is obtained in a yield of 90% or higher. As regards the above-described stress, the mean value in the core may be controlled. The stress may fluctuate in the core.

The core 11 of the optical fiber 1 contains $GeO_2$ and has a relative refractive index difference, $\Delta core$, greater than or equal to 0.2% and less than or equal to 0.32% and has a refractive index volume v greater than or equal to 9%·μm² and less than or equal to 18%·μm², the refractive index volume v being expressed by Eq. (2):

$$v = 2\int_0^a \Delta(r) \cdot r \, dr \quad (2)$$

where $\Delta r$ denotes the relative refractive index difference at a radial coordinate r and a denotes the radius of the core. The jacket 13 has a relative refractive index difference $\Delta J$ greater than or equal to 0.03% and less than or equal to 0.20%.

Furthermore, in the optical fiber 1, the fictive temperature of glass constituting the core 11 is greater than or equal to 1400° C. and less than or equal to 1560° C. Stress remaining in the core 11 is compressive stress. A cutoff wavelength measured on a fiber having a length of 2 m is greater than or equal to 1300 nm and a cutoff wavelength measured on a fiber having a length of 100 m is less than or equal to 1500 nm. In addition, an effective area at a wavelength of 1550 nm is greater than or equal to 110 μm² and a attenuation at a wavelength of 1550 nm is less than or equal to 0.19 dB/km. The nonlinearity of the optical fiber 1 can be significantly reduced lower than that in a general-purpose single-mode optical fiber without excessive increase in microbending loss at a wavelength of 1550 nm.

An optical fiber preform, which exhibits the above-described characteristics (the refractive index profile, the cutoff wavelengths, and the effective area), is drawn while being slowly cooled, thus producing the optical fiber. FIGS. 4 and 5 demonstrate that Rayleigh scattering can be reduced when the fictive temperature of the core is less than or equal to 1560° C., preferably, less than or equal to 1530° C. Although a lower fictive temperature is preferable, L/V has to be excessively increased in order to achieve a fictive temperature at or below 1400° C. by slow-cooling drawing. It is therefore difficult to satisfy economic requirements. Lower loss can be achieved by adding a very small amount of additive (alkali metal) that reduces the viscosity of the core. While the fictive temperature is reduced in this manner, excess loss at or below 0.03 dB/km can be achieved as long as the residual stress in the core is compressive stress, as illustrated in FIG. 6. Thus, the fiber with a attenuation at or below 0.190 dB/km at a wavelength of 1550 nm can be easily achieved.

As described above, the use of the structure of the optical fiber according to the present embodiment prevents an increase in loss caused by increased microbending loss after cable formation while keeping low attenuation caused by Rayleigh scattering, Brillouin scattering, and Raman scattering. Attenuation after cable formation is less than or equal to 0.19 dB/km, preferably less than or equal to 0.18 dB/km, and more preferably less than or equal to 0.178 dB/km. Although an optical fiber with a core of pure silica has lower attenuation, the production cost of the optical fiber with the pure silica core is typically high. The optical fiber, which satisfies the above-described requirements with the core having a refractive index increased by $GeO_2$, has economical superiority as an optical fiber suitable for high-speed large-capacity communication which has a transmission rate of more than 100 Gbit/s.

In the optical fiber 1, more preferably, a cutoff wavelength measured on a fiber having a length of 2 m is greater than or equal to 1400 nm. More preferably, the absolute value of compressive stress is greater than or equal to 5 MPa. More preferably, a attenuation at a wavelength of 1550 nm is less than or equal to 0.178 dB/km and a attenuation at a wavelength of 1310 nm is less than or equal to 0.315 dB/km. In addition, more preferably, a attenuation at a wavelength of 1550 nm is less than or equal to 0.175 dB/km and a attenuation at a wavelength of 1310 nm is less than or equal to 0.310 dB/km.

The optical fiber according to the present invention may have any refractive index profile, for example, a step-shaped, W-shaped, trench-shaped, or ring-core-shaped one as long as the core contains $GeO_2$. In this case, of a refractive index profile, a portion which substantially determines a mode field and through which a great part of power of light travels is defined as the core and a portion surrounding the core is defined as the optical cladding.

Figure 7:
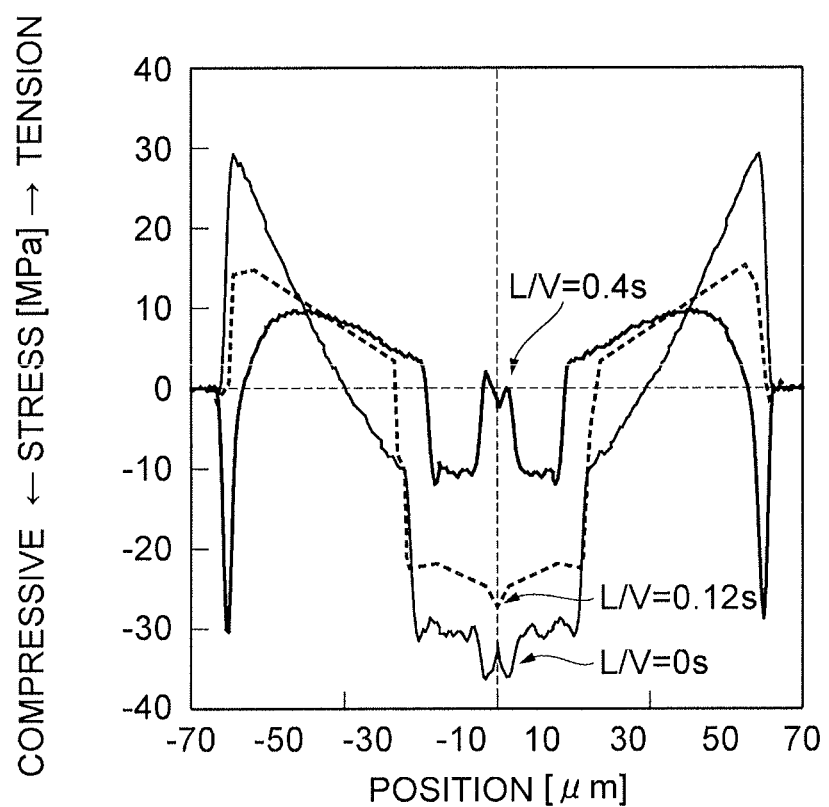
FIG. 7 is a graph illustrating the radial distribution of residual stress in the optical fiber.

As described in JP2009-168813A, residual stress in the optical fiber is measured using birefringence in the optical fiber. Alternatively, residual stress in the optical fiber can be measured on the basis of an amount of change in refractive index, obtained by area analysis on the refractive index in cross-section of the optical fiber, and a photoelastic coefficient inherent to a material. FIG. 7 is a graph illustrating the radial distributions of residual stress in an optical fiber. In the optical fiber including a $GeO_2$-containing core and a jacket that is substantially composed of pure silica, since the viscosity of the core is lower than that of the jacket at the same temperature, compressive stress remains in the core of the drawn optical fiber (L/V=0 s in FIG. 7). Compressive stress changes depending on drawing tension. It is known that, in principle, the higher the drawing tension, the larger the compressive stress remains.

Whereas, in the optical fiber subjected to slow cooling, compressive stress is relaxed, so that the absolute value of compressive stress is lowered. FIG. 7 illustrates residual stresses obtained by changing L/V to 0 s, 0.12 s, and 0.40 s. It is known that increasing residence time of the optical fiber in the heating furnace gradually reduces the absolute value of compressive stress in the core. To allow stress remaining of the core to be compressive stress, preferably, L/V is less than 0.4 s. Additionally, keeping the optical fiber at a temperature higher than an inner surface temperature in the heating furnace until the optical fiber reaches the heating furnace during cooling of the optical fiber can prevent compressive stress in the core from being excessively reduced. In principle, the longer the heating furnace, the larger the effect of slow cooling. Thus, the amount of change in compressive stress is increased.

For example, in the case where the heating furnace has a length greater than or equal to 2 m, it is preferable to maintain L/V at or below 0.2 s. Furthermore, tension applied to the optical fiber glass which is being drawn is preferably greater than or equal to 50 g, more preferably greater than or equal to 100 g.

As regards another method of controlling stress in the core, an additive to reduce the viscosity of the core may be added to the core, so that the absolute value of compressive stress in the core can be controlled at or above 5 MPa. A very small amount of alkali metal element can markedly reduce the viscosity of silica glass, thus reducing an effect on the increase of Rayleigh scattering caused by concentration fluctuations. Accordingly, an alkali metal element is preferably used as an additive. However, excessive addition of an alkali metal element causes an increase of glass structural defects, so that hydrogen characteristics and radiation characteristics are degraded. It is therefore preferable to adjust an amount to be a suitable value. Preferably, the concentration of alkali metal element in the core after drawing is greater than or equal to 1 wtppb and less than or equal to 10 wtppm.

Figure 8:
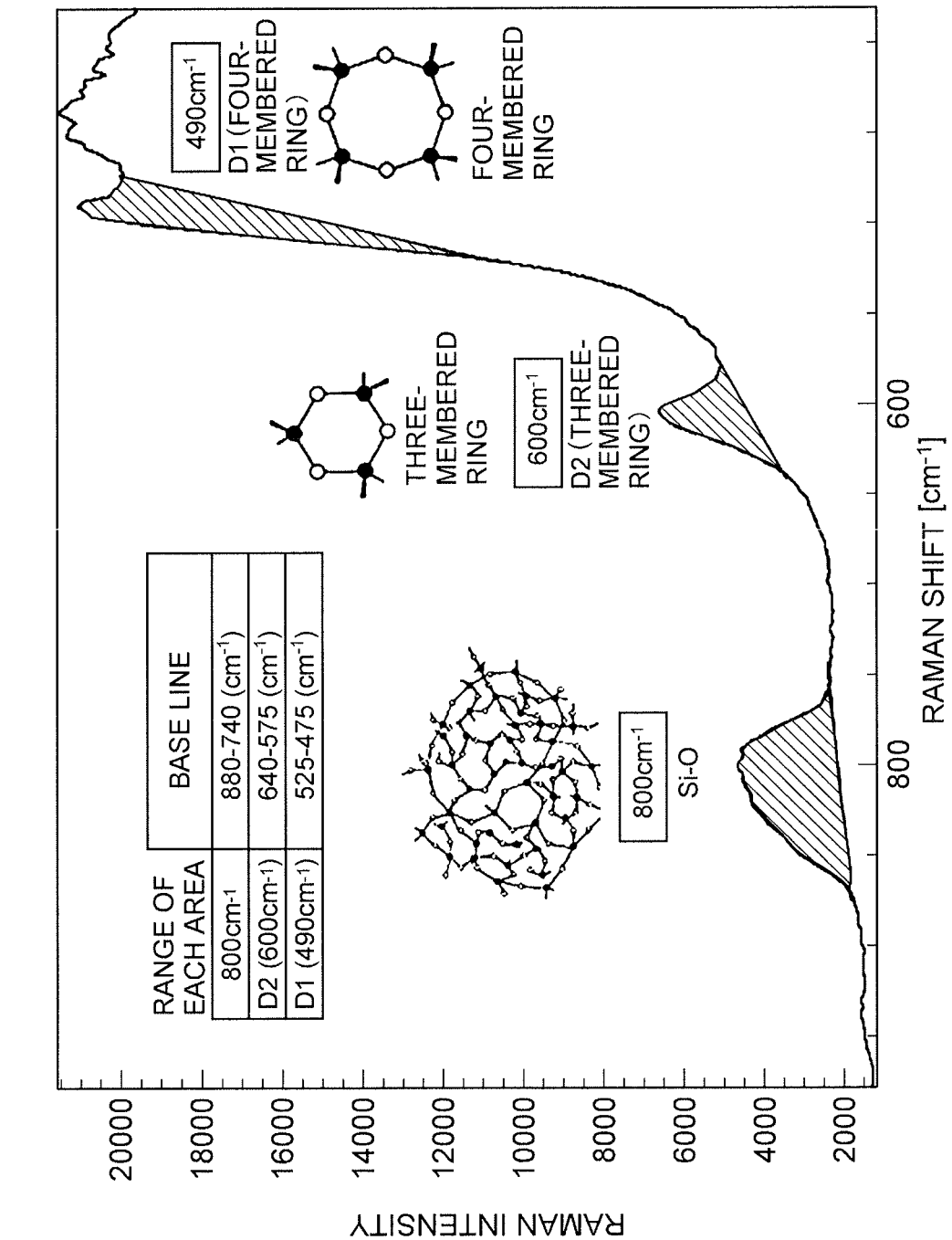
FIG. 8 is a graph illustrating the relationship between Raman intensity and Raman shift.

FIG. 8 is a graph illustrating the relationship between Raman intensity and Raman shift. A base line is drawn in a wave number range between 525 cm$^{-1}$ and 475 cm$^{-1}$ and the peak area of D1 between the base line and a spectrum is calculated. Furthermore, a base line is drawn in a wave number range between 880 cm$^{-1}$ and 740 cm$^{-1}$ and the peak area of 800 cm$^{-1}$ between the base line and a spectrum is calculated. The fictive temperature of the optical fiber can be obtained using the relation between the ratio of the 800 cm$^{-1}$ peak area to the D1 peak area and the fictive temperature measured using, for example, bulk glass by the IR method (D.-L. Kim et al., J. Non-Cryst. Solids, Vol. 286, pp. 136-138 (2001)).

In the optical fiber according to the present embodiment, preferably, stress in part of 50% or more of the cross-sectional area of the jacket in a cross-section perpendicular to the axis of the fiber is tensile stress. The sum of stress remaining in the optical fiber in the entire cross section is zero. To allow residual stress in the core to be compressive stress, therefore, tensile stress has to be allowed to remain in the jacket such that the magnitude of tensile force is equal to that of compressive force applied to the core. Controlling the tension, heat history, and composition of the optical fiber so that stress in 50% or more of the cross-sectional area of the jacket is tensile stress easily enables residual stress in the core to be compressive stress.

In the optical fiber according to the present embodiment, preferably, the absolute value of stress remaining in the core is less than or equal to 30 MPa. More preferably, the absolute value of stress remaining in the core is less than or equal to 10 MPa. It is preferable to allow stress in the core to be compressive stress and allow its absolute value to be less than or equal to 30 MPa, because excess loss can be less than or equal to 0.02 dB/km while the effect of reducing Rayleigh scattering by slow-cooling drawing is fully achieved.

In the optical fiber according to the present embodiment, preferably, an increment in attenuation due to OH groups at a wavelength of 1383 nm is less than or equal to 0.02 dB/km. The presence of OH absorption causes an increase in attenuation at a wavelength of 1550 nm. It is preferable that a attenuation due to OH groups at a wavelength of 1383 nm be less than or equal to 0.02 dB/km, since an increment in attenuation at a wavelength of 1550 nm can be less than or equal to 0.004 dB/km.

In the optical fiber according to the present embodiment, preferably, the core contains fluorine. Furthermore, preferably, the jacket has a higher viscosity than the core by 0.3 poise or more at a temperature of 1300° C. Since the core contains fluorine, the viscosity of the core is reduced, so that residual stress in the core can be easily allowed to be compressive stress. Thus, wavelength-independent attenuation can be reduced. Note that increasing fluorine content causes increase of Rayleigh scattering caused by concentration fluctuations. Preferably, therefore, fluorine is added at such a concentration that a reduction in relative refractive index due to addition of fluorine is greater than or equal to −0.1% and less than or equal to 0%.

In the optical fiber according to the present embodiment, preferably, a change in relative refractive index difference in the core during annealing for one minute or more at a temperature of 1300° C. after drawing is greater than or equal to 0.002% and less than or equal to 0.02%. Residual stress in the core of the optical fiber can be easily evaluated by measurement of a change in refractive index due to annealing. Consequently, quality can be easily controlled. As long as a change in relative refractive index difference in the core is greater than or equal to 0.002% and less than or equal to 0.02%, stress in the core is not increased by excess loss.

In the optical fiber according to the present embodiment, preferably, the difference in stress between the core and the optical cladding is less than or equal to 20 MPa. As long as the difference in stress between the core and the optical cladding is less than or equal to 20 MPa, excess loss of 0.03 dB/km or less is obtained with high yield when compressive stress is greater than or equal to 0 MPa and less than or equal to 5 MPa.

In the optical fiber according to the present embodiment, when the dependence of attenuation α on wavelength λ in a range of wavelengths greater than or equal to 1600 nm is approximated by the equation $\alpha = A \cdot \exp(B/\lambda)$, preferably, A is less than or equal to $6.5 \times 10^{11}$ and B is greater than or equal to 48.5. In the case where bending loss or loss at a wavelength of 1600 nm or more caused due to infrared absorption by an additive is out of the above-described range, a remarkable increase in excess loss appears at a wavelength of 1550 nm. It is preferable to control the refractive index profile or the amount of additive such that loss is within the above-described range.

Preferably, the optical fiber according to the present embodiment further includes a primary coating and a secondary coating which surround the jacket, the secondary coating has a Young's modulus greater than or equal to 800 MPa, and the primary coating has a Young's modulus greater than or equal to 0.2 MPa and less than or equal to 1 MPa. Consequently, microbending loss can be reduced, thus preventing an increase in attenuation after cable formation.

Preferably, in the optical fiber according to the present embodiment, the coated optical fiber has an outside diameter greater than or equal to 240 μm and the secondary coating has a thickness greater than or equal to 10 μm. The diameter of coating is preferably greater in order to maintain microbending loss at or below a given value. Allowing the coated optical fiber to have an outside diameter at or above 240 μm can provide microbending loss enough for practical use. In addition to the coating diameter control for reduction of microbending loss, the diameter of glass of the optical fiber may be controlled. In this case, preferably, glass has a greater outside diameter.

Preferred embodiments of an optical transmission system including the optical fiber according to the present invention as an optical transmission line are as follows.

In an optical transmission system according to a first embodiment, an optical transmission line between repeaters has a length greater than or equal to 70 km and the optical fiber according to the present invention is placed in a section of 90% or more of the optical transmission line. The use of the optical fiber according to the present invention can improve the OSNR of the optical transmission line between the repeaters, thus relaxing requirements for the performance of transmission devices. Preferably, the optical transmission line between the repeaters has a length greater than or equal to 100 km and the optical fiber according to the present invention is placed in a section of 90% or more of the optical transmission line. The longer the length of the optical transmission line between the repeaters, the greater the effect of attenuation on the OSNR. The use of the optical fiber according to the present invention can further relax requirements for the performance of transmission devices.

In an optical transmission system according to a second embodiment, the optical fiber according to the present invention is placed and signal light is distributed-Raman-amplified in the optical fiber. Reducing attenuation in the optical transmission line can increase the efficiency of excitation by distributed Raman amplification.

A method of making the optical fiber according to the foregoing embodiment is a method of making an optical fiber, the method including drawing an optical fiber preform in a drawing furnace, wherein the mean temperature in cross-section of the optical fiber in a position where the formed optical fiber emerging from the drawing furnace is substantially exposed to air is greater than or equal to 1200° C. and less than or equal to 1550° C. If the optical fiber positioned so as to be exposed to the air at the outlet of the drawing furnace is at a temperature above 1550° C., turbulence would occur, thus damaging control over the outside diameter of the optical fiber. Accordingly, the temperature is preferably less than or equal to 1550° C. Whereas, excessively increasing the cooling rate causes an increase in attenuation. The above-described temperature range is therefore preferable.

In the optical fiber making method according to the present embodiment, preferably, the optical fiber is at a temperature at or above 1000° C. when entering a heating furnace disposed downstream from the drawing furnace. As regards an optical fiber including a $GeO_2$-containing core, a temperature for maintaining the optical fiber to facilitate reduction of the fictive temperature is at or above 1000° C. If the temperature upon entrance to the heating furnace is below 1000° C., a period of time during which the effect of slow cooling is not effective would increase, so that the loss reduction effect based on reduction of the fictive temperature is not fully achieved. More preferably, the temperature of the optical fiber upon entrance to the heating furnace is at or above 1200° C.

In the optical fiber making method according to the present embodiment, preferably, an optical fiber preform in which the concentration of OH at the interface between the optical cladding and the jacket is less than or equal to 1000 wtppm is drawn. Reducing the cooling rate of the optical fiber facilitates diffusion of OH groups in the optical fiber preform, thus increasing OH absorption loss at a wavelength of 1383 nm. As long as the concentration of OH at the interface between the optical cladding and the jacket is less than or equal to 1000 wtppm, a sharp gradient of OH concentration is not formed. Even if the cooling rate is reduced by, for example, slow-cooling drawing, the diffusion of OH to the core can be prevented. Preferably, the OH concentration is less than or equal to 800 wtppm. In addition, the thickness of an OH-diffused layer in the interface is less than or equal to 50 nm in optical-fiber diameter equivalent.

The optical fiber according to the present invention is useful as an optical transmission line which requires a high OSNR.

What is claimed is:
1. A silica glass optical fiber comprising:
a core including the center axis;
an optical cladding surrounding the core; and
a jacket surrounding the optical cladding,
wherein the core contains $GeO_2$, a relative refractive index difference $\Delta$core of the core is greater than or equal to 0.2% and less than or equal to 0.32%, and a refractive index volume v of the core is greater than or equal to 9%·μm$^2$ and less than or equal to 18%·μm$^2$, the refractive index volume v being expressed by Eq. (1)

$$v=2\int_0^a \Delta(r)\cdot r\cdot dr \quad (1)$$

where $\Delta(r)$ denotes the relative refractive index difference at a radial coordinate r and $a$ denotes the diameter of the core,
wherein the jacket has a relative refractive index difference $\Delta J$ greater than or equal to 0.03% and less than or equal to 0.20%,
wherein glass constituting the core has a fictive temperature greater than or equal to 1400° C. and less than or equal to 1560° C.,
wherein stress remaining in the core is compressive stress,
wherein a cutoff wavelength measured on a fiber having a length of 2 m is greater than or equal to 1300 nm,
wherein a cutoff wavelength measured on a fiber having a length of 100 m is less than or equal to 1500 nm,
wherein an effective area at a wavelength of 1550 nm is greater than or equal to 110 μm$^2$, and
wherein a attenuation at a wavelength of 1550 nm is less than or equal to 0.19 dB/km.

2. The optical fiber according to claim 1, wherein
the fictive temperature is less than or equal to 1530° C.

3. The optical fiber according to claim 1,
wherein a attenuation at a wavelength of 1550 nm is less than or equal to 0.178 dB/km, and
wherein a attenuation at a wavelength of 1310 nm is less than or equal to 0.315 dB/km.

4. The optical fiber according to claim 1, wherein
stress in part of 50% or more of the cross-sectional area of the jacket in a cross section perpendicular to the axis of the fiber is tensile stress.

5. The optical fiber according to claim 1, wherein
the absolute value of stress remaining in the core is less than or equal to 30 MPa.

6. The optical fiber according to claim 1, wherein
an increment in attenuation due to OH groups at a wavelength of 1383 nm is less than or equal to 0.02 dB/km.

7. The optical fiber according to claim 1, wherein
the core contains fluorine.

8. The optical fiber according to claim 1, wherein
the jacket has a higher viscosity than the core by 0.3 poise or more at a temperature of 1300° C.

9. The optical fiber according to claim 1, wherein
a change in relative refractive index difference of the core during annealing for one minute or more at a temperature of 1300° C. after drawing is greater than or equal to 0.002% and less than or equal to 0.02%.

10. The optical fiber according to claim 1, wherein
the difference in stress between the core and the optical cladding is less than or equal to 20 MPa.

11. The optical fiber according to claim 1, wherein
the optical fiber has an attenuation α, the attenuation a being approximated by the equation $\alpha = A\cdot \exp(B/\lambda)$ in a range of wavelengths greater than or equal to 1600 nm by using least squares, where $\lambda$ denotes a wavelength and A is less than or equal to $6.5\times 10^{11}$ and B is greater than or equal to 48.5.

12. The optical fiber according to claim 1, further comprising:
a primary coating and a secondary coating which surround the jacket,
wherein the secondary coating has a Young's modulus greater than or equal to 800 MPa, and
wherein the primary coating has a Young's modulus greater than or equal to 0.2 MPa and less than or equal to 1 MPa.

13. The optical fiber according to claim 1, wherein
the optical fiber with coating has an outside diameter greater than or equal to 240 μm and a secondary coating has a thickness greater than or equal to 10 μm.

14. An optical transmission system comprising:
two repeaters; and
an optical transmission line connecting the two repeaters,
wherein the optical transmission line has a length greater than or equal to 70 km, and wherein a section of 90% or more of the optical transmission line includes the optical fiber according to any one of claims 1 to 13.

15. An optical transmission system comprising:

an optical transmission line including the optical fiber according to any one of claims 1 to 13, wherein signal light is distributed-Raman-amplified in the optical fiber.

\* \* \* \* \*